US009495900B2

(12) United States Patent
Tanaka et al.

(10) Patent No.: US 9,495,900 B2
(45) Date of Patent: Nov. 15, 2016

(54) DISPLAY DEVICE

(71) Applicant: Japan Display Inc., Tokyo (JP)

(72) Inventors: Yukio Tanaka, Tokyo (JP); Daiichi Suzuki, Tokyo (JP); Kazuhiro Nishiyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 12 days.

(21) Appl. No.: 14/476,999

(22) Filed: Sep. 4, 2014

(65) Prior Publication Data

US 2015/0062100 A1 Mar. 5, 2015

(30) Foreign Application Priority Data

Sep. 5, 2013 (JP) ................................. 2013-183837

(51) Int. Cl.
*G06F 3/038* (2013.01)
*G09G 5/00* (2006.01)
*G09G 3/20* (2006.01)
*G09G 3/36* (2006.01)

(52) U.S. Cl.
CPC .......... *G09G 3/2096* (2013.01); *G09G 3/3648* (2013.01); *G09G 2310/08* (2013.01); *G09G 2320/0247* (2013.01); *G09G 2320/103* (2013.01); *G09G 2340/0435* (2013.01)

(58) Field of Classification Search
CPC ............. G09G 3/3688; G09G 3/3648; G09G 2330/021
USPC ............................ 345/87–100, 204, 211–213
See application file for complete search history.

(56) References Cited

U.S. PATENT DOCUMENTS 5,696,524 A * 12/1997 Hoshino .............. G09G 3/3625 345/100
5,959,598 A * 9/1999 McKnight ................. G06T 3/40 345/87
2006/0125742 A1* 6/2006 Sekiguchi ............ G09G 3/3406 345/80
2008/0158234 A1* 7/2008 Kim ..................... G09G 3/2096 345/501
2008/0165106 A1* 7/2008 Park ..................... G09G 3/2022 345/89
2010/0020112 A1* 1/2010 Jeon ..................... G09G 3/3648 345/690
2010/0202758 A1* 8/2010 Yoshida ............... G09G 3/3648 386/241
2013/0038621 A1* 2/2013 Choi .................... G09G 3/2092 345/589

FOREIGN PATENT DOCUMENTS

JP 2003-66920 3/2003
WO 2013/021576 A1 2/2013

* cited by examiner

*Primary Examiner* — Kimnhung Nguyen
(74) *Attorney, Agent, or Firm* — Typha IP LLC

(57) ABSTRACT

When normal driving is switched to intermittent driving simultaneously with switching from a video image to a still image, a flicker may occur due to a response delay caused by dielectric anisotropy of liquid crystal. A display device has a first mode (video image driving) in which driving is performed at a first frame frequency and a second mode (still image driving) in which the driving is performed at a second frame frequency lower than the first frame frequency. When the first mode is switched to the second mode, the display device first performs the driving at a frame frequency higher than the second frame frequency for at least one frame and then, the driving is switched to be performed at the second frame frequency.

9 Claims, 6 Drawing Sheets

50

DISPLAY DEVICE

CLAIM OF PRIORITY

The present application claims priority from Japanese patent application JP2013-183837 filed on Sep. 5, 2013, the content of which is hereby incorporated by reference into this application.

BACKGROUND

The present disclosure relates to a display device which can be applied to a liquid crystal display device that performs intermittent driving.

It is imperative that liquid display devices for mobile terminals such as smartphones and tablet terminals reduce power consumption by circuits. As methods for reducing power consumption, low-frequency driving and intermittent driving have been proposed. The low-frequency driving is a scheme for reducing a driving frequency of a liquid crystal display device to ½, ¼, or the like of a standard condition and thereby reducing circuit power. The intermittent driving is a scheme for reducing circuit power by setting several display time periods in which circuits are stopped after a liquid crystal display device performs writing for one display time period. Both schemes may elongate time intervals at which an image signal is rewritten in a liquid crystal display unit, thereby causing an adverse effect such as blurring of a video image. However, the schemes are effective to reduce circuit power for displaying still images in which video image visibility is not important.

A liquid crystal display device disclosed in International Publication No. WO2013/021576 switches a refresh (frame) frequency according to an image to be displayed. A frame frequency of 60 Hz (normal driving) is used for displaying video images, while a frame frequency of 1 Hz (intermittent driving) is used for displaying still images.

Hereinafter, regarding the low-frequency driving and the intermittent driving, a time interval at which an image signal of a pixel is rewritten is referred to as a “frame cycle” or “one frame”, and the inverse of the time interval is referred to as a “frame frequency”.

SUMMARY

The present inventors found the following problem as a result of consideration of intermittent driving of a display device of a hold-driving scheme (display scheme for continuously displaying a previous image until the next image is received).

Specifically, when the normal driving is switched to the intermittent driving simultaneously with switching from a video image to a still image, a flicker occurs due to a response delay caused by dielectric anisotropy of liquid crystal.

Other challenges and new characteristics are clarified from the following description of the present disclosure and the accompanying drawings.

A representative outline of the present disclosure is briefly described below.

A display device has a first mode in which driving is performed at a first frame frequency and a second mode in which the driving is performed at a second frame frequency lower than the first frame frequency. When the first mode is switched to the second mode, the driving is first performed at a frame frequency higher than the second frame frequency for at least one frame and then, the driving is switched to be performed at the second frame frequency.

The display device can prevent a flicker from being visually recognized.

DESCRIPTION OF THE PREFERRED EMBODIMENT

Embodiment

Figure 1:
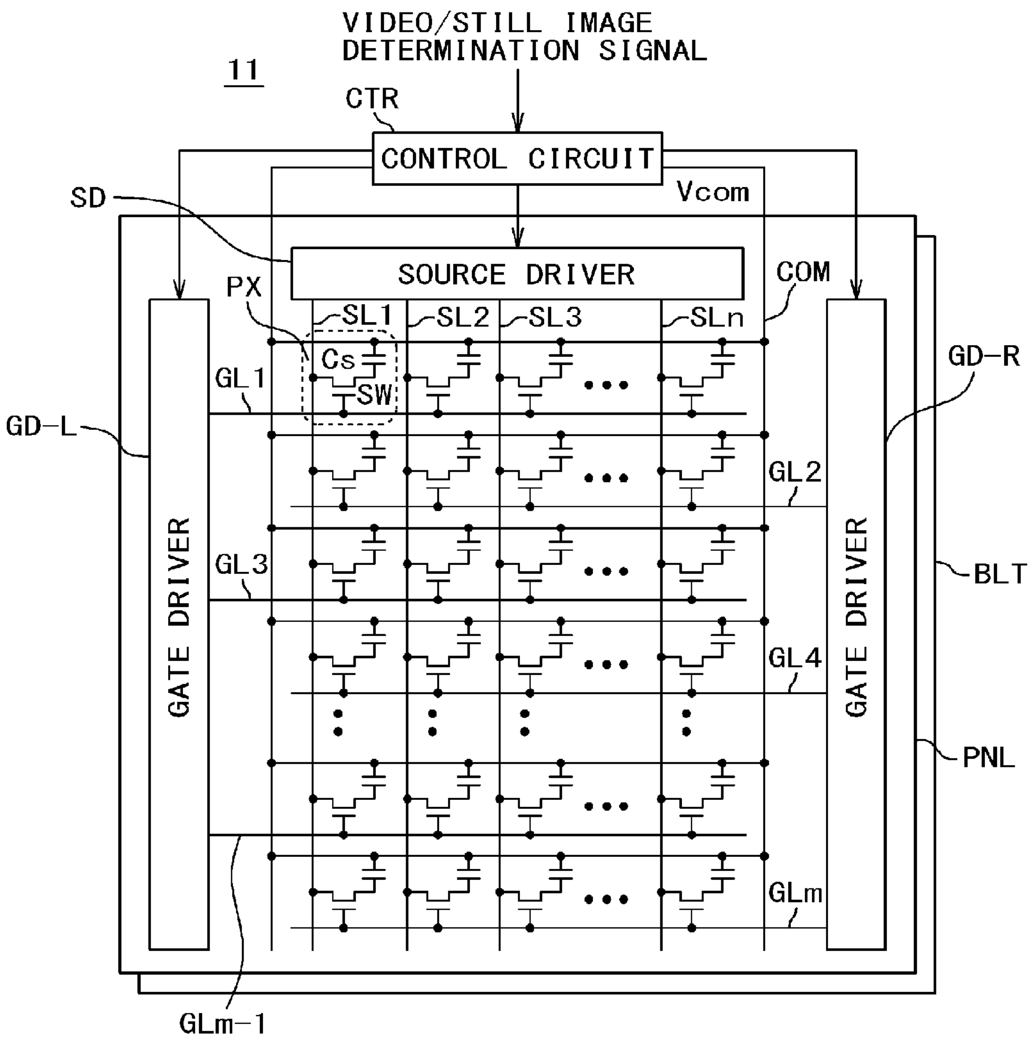
FIG. 1 is a diagram illustrating a configuration of a liquid crystal display device according to an embodiment.

A representative outline of an embodiment is briefly described below.

(1) A display device has a first mode in which driving is performed at a first frame frequency and a second mode in which the driving is performed at a second frame frequency lower than the first frame frequency. When the first mode is switched to the second mode, the driving is first performed at a frame frequency higher than the second frame frequency for at least one frame and then, the driving is switched to be performed at the second frame frequency.

(2) In the display device described in the aforementioned item (1), the frame frequency that is higher than the second frame frequency is the first frame frequency.

(3) In the display device described in the aforementioned item (2), the first mode is normal driving for a video image and the second mode is intermittent driving for a still image.

(4) In the display device described in the aforementioned item (3), the first frame frequency is 60 Hz and the second frame frequency is 1 Hz.

(5) In the display device described in the aforementioned item (1), when the first mode is switched to the second mode, the driving is first performed at the frame frequency higher than the second frame frequency for two or three frames and then, the driving is switched to be performed at the second frame frequency.

(6) A display device has a first mode in which writing is performed on pixels in a first cycle and a second mode in which the writing is performed on pixels in a second cycle longer than the first cycle. When the first mode is switched to the second mode, the writing is first performed on pixels arranged in the same row at least two times in a cycle shorter than the second cycle and then, the writing is performed on the pixels in the second cycle.

(7) In the display device described in the aforementioned item (6), the cycle that is shorter than the second cycle is the first cycle.

(8) In the display device described in the aforementioned item (7), the first mode is normal driving for a video image, and the second mode is intermittent driving for a still image.

(9) In the display device described in the aforementioned item (8), the first cycle is 1/60 seconds, and the second cycle is 1 second.

(10) In the display device described in the aforementioned item (6), when the first mode is switched to the second mode, the writing is first performed on the pixels arranged in the same row three or four times in a cycle shorter than the second cycle and then, the writing is performed on the pixels in the second cycle.

(11) A display device includes a display panel (PNL) and a control circuit (CTR). The display panel (PNL) includes a source driver (SD) and gate drivers (GD-L, GD-R). The control circuit (CTR) controls the gate drivers (GD-L, GD-R) and the source driver (SD) at a first frame frequency when displaying a video image. The control circuit controls the gate drivers (GD-L, GD-R) and the source driver (SD) at of a second frame frequency lower than the first frame frequency when displaying a still image. The control circuit (CTR) performs driving at the first frame frequency according to a video/still image determination signal for at least one frame and switches the driving to be performed at the second frame frequency.

(12) In the display device described in the aforementioned item (11), the display panel (PNL) includes a plurality of pixels (PX) arranged in a matrix form, and the plurality of pixels (PX) each include a pixel switch (SW) formed of a TFT, a pixel electrode (PE) connected to the pixel switch (SW), a common electrode (COM), and a liquid crystal layer (LQ).

(13) In the display device described in the aforementioned item (11), the first frame frequency is 60 Hz, and the second frame frequency is 1 Hz.

(14) In the display device described in the aforementioned item (11), the control circuit (CTR) includes a frame frequency determining circuit (50), and the frame frequency determining circuit (50) generates a frame frequency determination signal on the basis of the video/still image determination signal. If the frame frequency determination signal is in a first state, the control circuit (CTR) performs the driving according to the first frame frequency. If the frame frequency determination signal is in a second state, the control circuit (CTR) performs the driving according to the second frame frequency.

(15) In the display device described in the aforementioned item (14), the frame frequency determining circuit (50) includes a delay circuit (53), a logical sum element (51), and a frame start signal generating circuit (52). The frame start signal generating circuit (52) generates a frame start signal on the basis of the frame frequency determination signal. The delay element (53) has a function of transferring a value on an input side to an output side upon an input of the frame start signal.

Hereinafter, the embodiment is described with reference to the accompanying drawings. In the following description, the same constituent elements are denoted by the same reference numerals and symbols, and a repetitive description is omitted.

FIG. 1 is a diagram illustrating a configuration of a liquid crystal display device according to the embodiment. The liquid crystal display device 11 according to the embodiment includes a liquid crystal display panel PNL and a backlight BLT. The liquid crystal display panel PNL has a display unit including display pixels PX arranged in a matrix form. The backlight BNT serves as an illuminating unit for illuminating the liquid crystal display panel PNL from a back surface side.

The display panel PNL has scanning lines GL (GL1, GL2, GL3, GL4, . . . , GLm−1, GLm), signal lines SL (SL1, SL2, SL3, . . . , SLn), and pixel switches SW in the display unit. The scanning lines GL extend along rows in which the plurality of display pixels PX are arranged, while the signal lines SL extend along columns in which the plurality of display pixels PX are arranged. The pixel switches SW are arranged near positions at which the scanning lines GL intersect with the signal lines SL. The pixels PX include the pixel switches SW and pixel capacitors Cs.

The pixel switches SW have thin film transistors (TFTs). Gate electrodes of the pixel switches SW are electrically connected to the corresponding scanning lines GL. Source electrodes of the pixel switches SW are electrically connected to the corresponding signal lines SL. Drain electrodes of the pixel switches SW are electrically connected to corresponding pixel electrodes PE.

The display panel PNL includes gate drivers GD (left-side gate driver GD-L and right-side gate driver GD-R) and a source driver SD that serve as driving units for driving the plurality of display pixels PX. The plurality of scanning lines GL are electrically connected to output terminals of the gate drivers GD. The plurality of signal lines SL are electrically connected to output terminals of the source driver SD.

The gate drivers GD and the source driver SD are arranged in a region surrounding the display unit. The gate drivers GD sequentially apply a turn-on voltage to the plurality of scanning lines GL and supply the turn-on voltage to gate electrodes of pixel switches electrically connected to a selected scanning line GL. A part between source and drain electrodes of the pixel switches provided with the gate electrodes to which the turn-on voltage is supplied becomes conductive. The source driver SD supplies, to the plurality of signal lines SL, output signals corresponding to the plurality of signal lines SL. The signals supplied to the signal lines SL are applied to corresponding pixel electrodes PE through pixel switches SW of which parts between the source and drain electrodes are conductive.

Operations of the gate drivers GD and an operation of the source driver SD are controlled by a control circuit CTR arranged outside the liquid crystal display panel PNL. The control circuit CTR supplies a counter voltage (Vcom) to common electrode (counter electrode) COM.

The control circuit CTR has an intermittent driving function of reducing power for driving. As an example, it is assumed that a standard frame frequency of the liquid crystal display device is 60 Hz. In other words, it is assumed that image signals are rewritten in the pixels at time intervals of 1/60 seconds. When displaying a video image, the liquid crystal display device operates with the standard frequency of 60 Hz. When displaying a still image for which video image visibility is not so important, a signal is written (scanning from an upper side of a screen to a lower side of the screen) for a time period of 1/60 seconds, and a break time period of, for example, 1/60 seconds, 3/60 seconds, 7/60 seconds, or 59/60 seconds is provided after the writing of the signal. If the control circuit CTR stops operating for the break time period, power consumption of the circuit for the break time period is substantially 0, and power consumption of the circuit for an average time period including a time period for writing is reduced to 1/2, 1/4, 1/8, or 1/60.

Since it is necessary to maintain a screen for a long time period after the writing in the pixels in the aforementioned driving, it is preferable that TFTs that cause a small amount of off-leak currents be used. For example, TFTs formed using an IGZO (In—Ga—Zn oxide) generally cause a small amount of off-leak currents and are said to be suitable for the aforementioned low-frequency driving.

The liquid crystal display device 11 according to the embodiment is a liquid crystal display device of a fringe-field switching (FFS) mode which generates an electric field in a liquid crystal layer LQ by the difference between the voltage applied to the counter electrode COM and the voltage applied to the pixel electrodes PE, thereby controlling orientation directions of liquid crystal molecules included in the liquid crystal layer LQ. The amount of light emitted from the backlight BLT and to be transmitted is controlled by the orientation directions of liquid crystal molecules.

Figure 4:
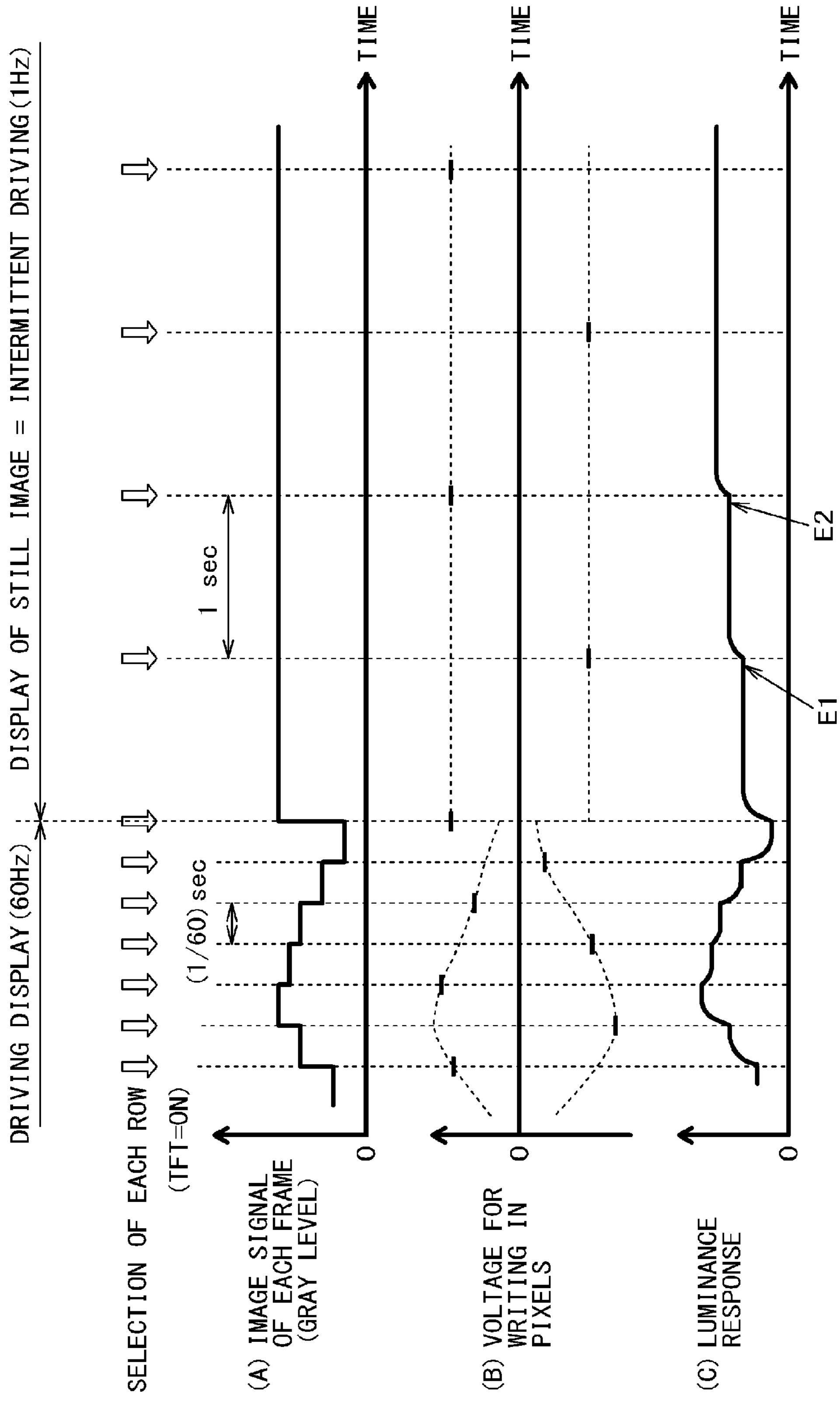
FIG. 4 is an operational timing chart of a liquid crystal display device according to a comparative example.

FIG. 4 is an operational timing chart of a liquid crystal display device according to a comparative example. The liquid crystal display device according to the comparative example performs normal driving (with on a frame frequency of, for example, 60 Hz) for display of a video image and performs intermittent driving (with a frame frequency of, for example, 1 Hz) for display of a still image. When an image to be supplied to the liquid crystal display device according to the comparative example is switched from a video image to a still image, the liquid crystal display device according to the comparative example performs the following operations.

In a time period in which a video image is displayed, a control circuit CTR controls gate drivers GD at the frame frequency of 60 Hz and selects each row (or turns on TFTs arranged in each row) at a time cycle of 1/60 seconds. By supplying image signals from a source driver according to the selection of each row, voltages that correspond to the image signals are written in pixels arranged in the row and held for one frame. In general, in order to prevent charge-up from occurring due to application of a DC voltage to liquid crystal for a long time, the voltage to be written in the liquid crystal is switched between positive and negative polarities for each frame (alternating-current driving). Although the luminance of the liquid crystal responds according to the voltages (voltages applied to the liquid crystal) written in the pixels, the response is slightly delayed due to the viscosity of the liquid crystal and a waveform of the luminance response is slightly indistinct.

When a video image is switched to a still image, the control circuit CTR switches the frame frequency to 1 Hz. For example, after the scanning is performed by the gate drivers GD for the time period of 1/60 seconds as described above, the control circuit CTR stops operating for the break time period of, for example, 59/60 seconds. In this case, although image signals are supplied from the source driver SD for each frame, the image signals for the pixels are temporally constant due to the still image. Positive and negative voltages of which absolute values are substantially equal to each other are alternately applied to the liquid crystal so that each voltage is applied for a respective frame. The absolute values of the voltages applied to the liquid crystal are almost constant for each frames, so the luminance response of the liquid crystal is constant in a normal state. In only several frames for a transition period immediately after switching from a video image to a still image, discontinuous changes E1 and E2 in the luminance occur due to a delay of the response.

Figure 3A:
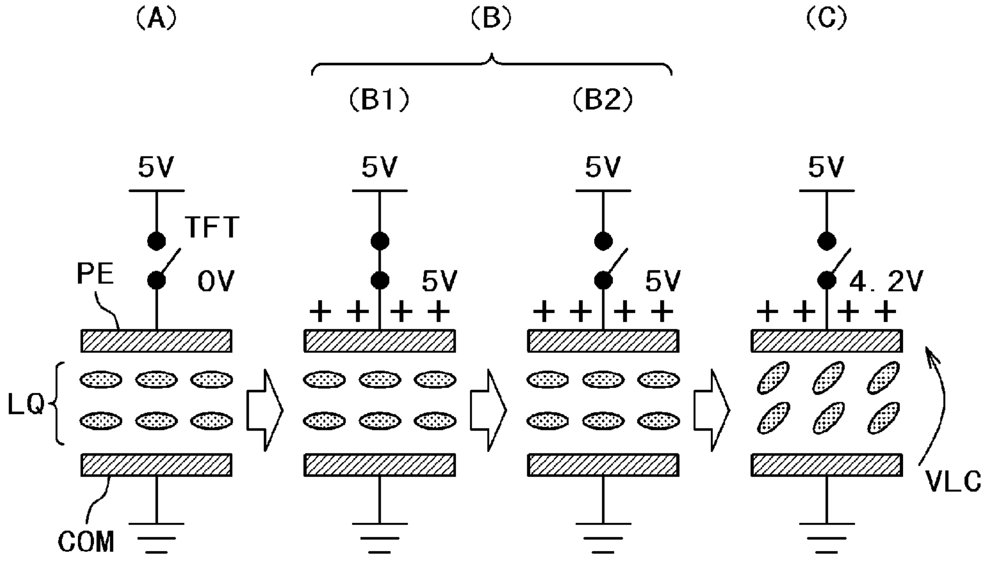
FIG. 3A is a diagram describing behaviors of liquid crystal for a transition period immediately after switching from a video image to a still image.
Figure 3B:
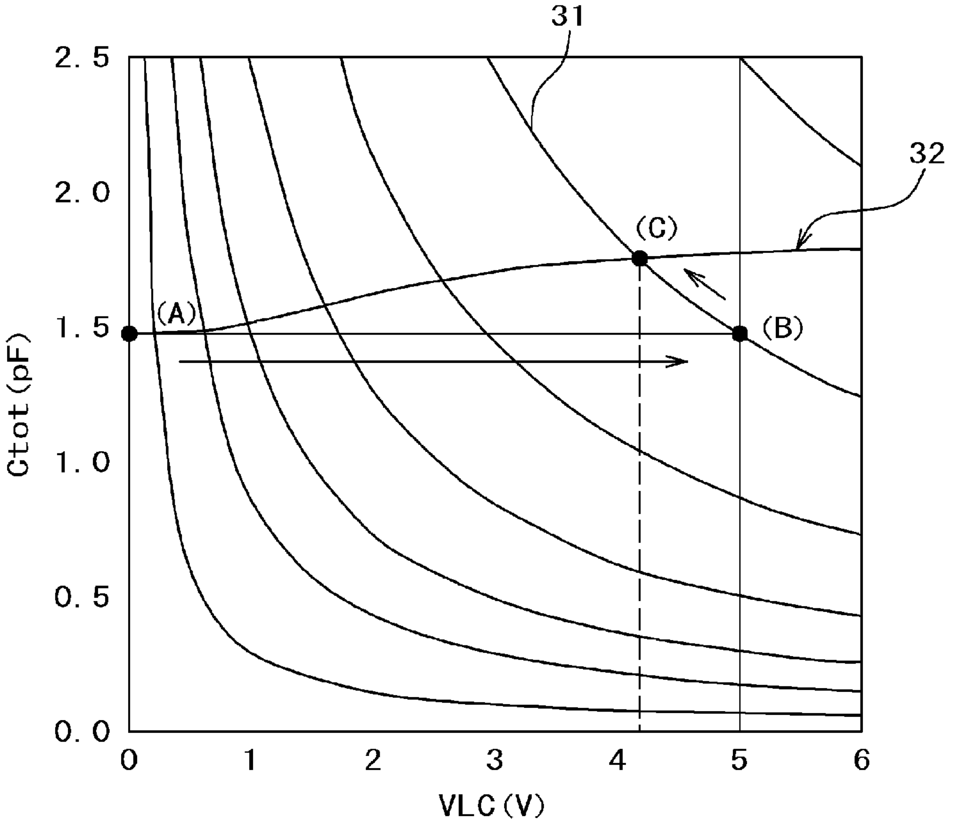
FIG. 3B is a diagram describing behaviors of the liquid crystal for a transition period immediately after switching from a video image to a still image.

FIGS. 3A and 3B are diagrams describing operations of the liquid crystal for a transition period immediately after switching from a video image to a still image. A case where an image signal (black) of 0 V is written in the pixels PX for the last frame of the video image, and an image signal (white) of 5 V is written in the pixels PX for the still image after the writing of the image signal of 0 V is considered.

Since the liquid crystal molecules have different permittivities in long and short axis directions of the molecules, so-called dielectric anisotropy, and change their orientation directions according to a voltage applied to the molecules, a permittivity (pixel capacitance) of the liquid crystal layer LQ changes depending on the applied voltage. In general, the lower the applied voltage, the smaller the pixel capacitance. The higher the applied voltage, the larger the pixel capacitance. FIG. 3B illustrates an example of relationships between the pixel capacitance (Ctot) and the applied voltage (VLC) (C-V characteristics). The applied voltage is the voltage applied to the liquid crystal. The pixel capacitance is capacitance of the pixel capacitors Cs.

(a) Initial State

First, when the image signal (black) of 0 V is written in the pixels PX for the last frame of the video image and the TFTs (pixel switches SW) are turned off as represented by (A) of FIG. 3A, the pixel capacitors become a state in which capacitance is small and corresponds to 0 V ((A) in FIG. 3B).

(b) Writing in Pixels

Next, when the video image is changed to the still image, the TFTs are turned on, and the pixels PX are selected, a voltage of 5 V is charged (the white image signal is written) in the pixels PX through the TFTs (VLC=5V). Since a time period in which the TFTs are turned on is significantly shorter than a response time of the liquid crystal, the liquid crystal layer LQ maintains an orientation corresponding to the voltage of 0 V during the time period in which the TFTs are turned on as shown by (B1) in FIG. 3A. In this time, the pixel capacitors maintain capacitance (permittivity) corresponding to the voltage of 0 V during the time period in which the TFTs are turned on (this state corresponds to a state represented by (B) of FIG. 3B). As represented by (B2) of FIG. 3A, immediately after the TFTs are turned off, the liquid crystal layer LQ maintains the orientation corresponding to the voltage of 0 V and the pixel capacitors maintain the capacitance corresponding to the voltage of 0 V.

(c) Retention Period

After that, when the TFTs are turned off and the period transitions to a retention period (holding period), the liquid crystal responds, an orientation direction of the liquid crystal changes as represented by (C) of FIG. 3A, and the pixel capacitance increases due to an increase in the permittivity. However, during the retention period, an electric charge is not supplied to the pixels and electric charges are redistributed. Thus, the voltage (VLC) applied to the liquid crystal is reduced. The amount of electric charges is represented by Q. When the pixel capacitance (Ctot) increases, the applied voltage (VLC) is reduced in inversely proportional to the pixel capacitance (Ctot) according to a relationship expressed by Equation (1).

$$Q = Ctot \cdot VLC = \text{a constant value} \quad (1)$$

States of the pixels transition from the state represented by (B) of FIG. 3B along a curve 31 representing the relationship of (Ctot·VLC=the constant value) to an equilibrium state represented by a point (C) at which the curve 31 intersects with a C-V characteristic curve 32. Thus, a voltage (of approximately 4.2 V in FIG. 3B) that is lower than the actually applied voltage of 5 V is held in the pixels.

Due to the dielectric anisotropy, the writing performed once does not cause the held voltage to reach the target voltage to be held.

After that, a still image is sequentially written second, third, . . . , times, and an image signal having the absolute value of 5 V is written each time. The voltage converges to the target voltage (to be maintained) of 5 V by the writing performed several times. Until the voltage converges to the target voltage, the voltage held by the liquid crystal increases in a stepwise manner and the luminance (transmittance) response changes in a stepwise manner. Since a time period for one frame is long in the intermittent driving, a change in the luminance occurs at intervals of 1 second and is recognized as a flicker by human eyes.

Figure 2:
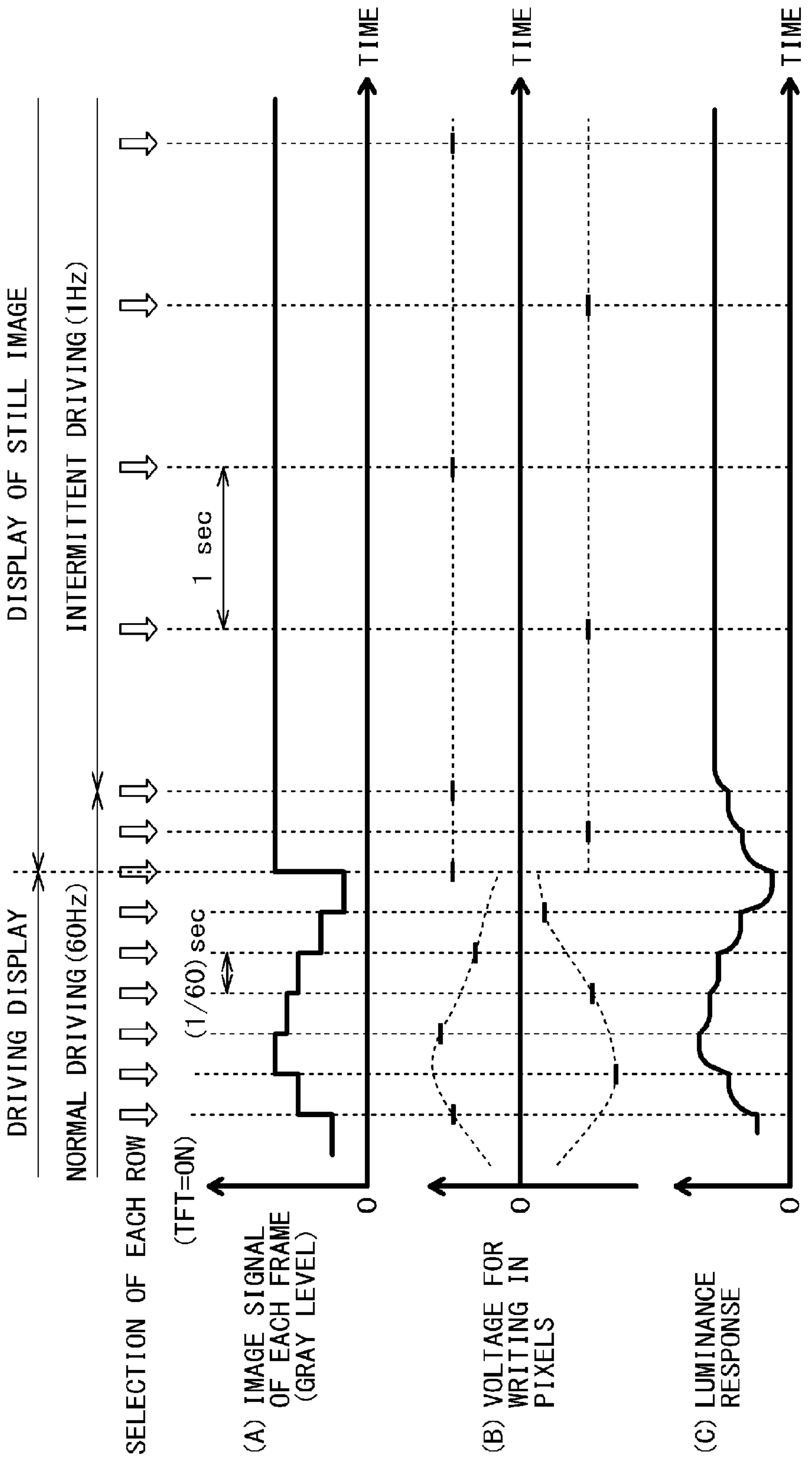
FIG. 2 is an operational timing chart of the liquid crystal display device according to the embodiment.

FIG. 2 is operational timing chart of the liquid crystal display device according to the embodiment. A method according to the embodiment illustrated in FIG. 2 has a feature in which a time period for each of two frames after switching from a video image to a still image is not 1 second (intermittent driving) and is 1/60 seconds (normal driving). Other time intervals are the same as the operational timing chart of the liquid crystal display device according to the comparative example illustrated in FIG. 4. A still image is written three times within a time period for the two frames. This operation enables the stepwise change in the luminance response described with reference to FIGS. 3A and 3B to converge within a time period of 2/60 corresponding to two frames, thus a flicker is almost not recognized by human eyes.

In a hold-driving type liquid crystal display device that performs writing in TFTs, electric charges are not supplied to pixel electrodes during a retention period after writing in pixels (turning on TFTs), and a held voltage changes in response to a change, caused by a response of liquid crystal, in a permittivity (Q=CV=a constant value) and becomes different from a voltage for writing. Thus, in order to cause the permittivity (luminance) of the liquid crystal of the pixels to reach a target level, it is necessary to repeat steps from a step of writing in the pixels to a step of holding a voltage a plurality (two or three times in general) of times.

Since liquid crystal responds in a stepwise manner at intervals of 1 second when the driving is switched to the intermittent driving (1 Hz) simultaneously with switching from a video image to a still image as described in the comparative example, the response is visually recognized as a flicker. In the embodiment, however, the frame frequency is 60 Hz in a time period for two or three frames immediately after switching from a video image to a still image, a transient response is completed for a time period of 2/60 seconds or 3/60 seconds, and a flicker is not visually recognized.

Figure 5A:
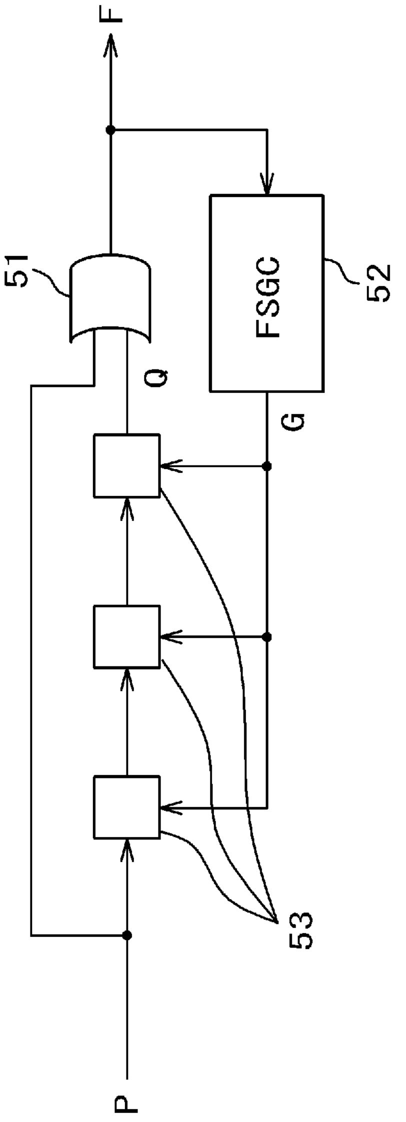
FIG. 5A is a block diagram of a frame frequency determining circuit according to the embodiment.
Figure 5B:
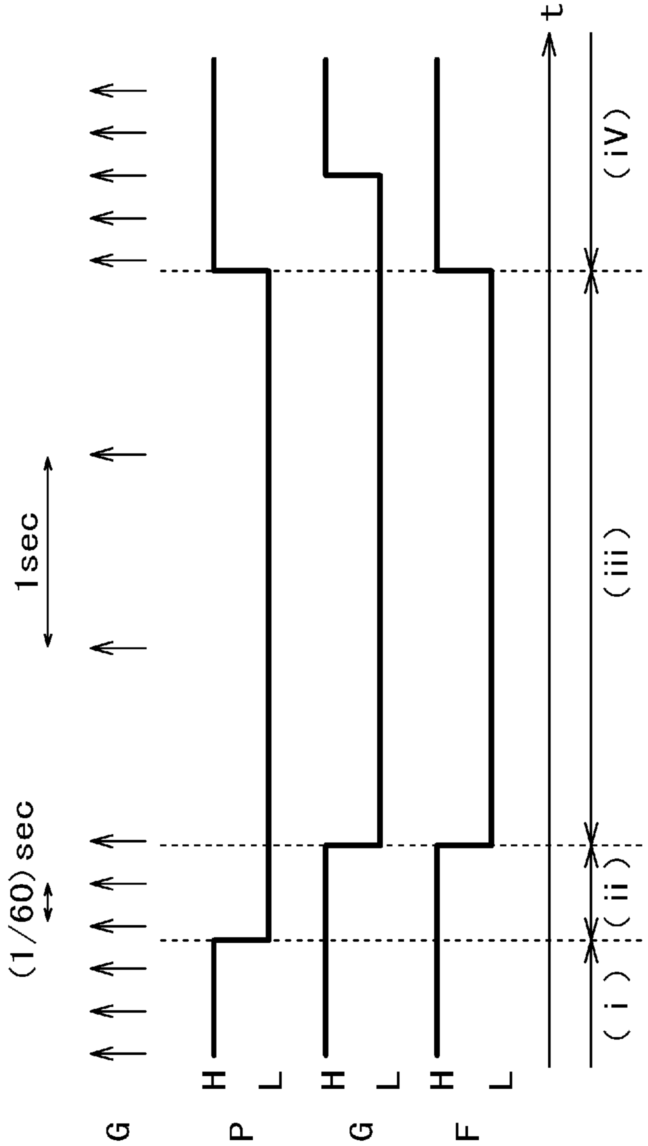
FIG. 5B is a timing waveform diagram of the frame frequency determining circuit according to the embodiment.

FIG. 5A is a block diagram of a frame frequency determining circuit according to the embodiment. FIG. 5B is a timing waveform diagram of the frame frequency determining circuit according to the embodiment.

The liquid crystal display device 11 has the frame frequency determining circuit 50 for determining a frame frequency depending on whether an input signal is a video image or a still image. This function is included in the control circuit CTR illustrated in FIG. 1. A video/still image determination signal (P) is supplied to the frame frequency determining circuit 50 depending on whether an input signal is a video image or a still image. As binary logic, the video image corresponds to a high (H) level, and the still image corresponds to a low (L) level. The frame frequency determining circuit 50 performs a process on the basis of the video/still image determination signal (P) and outputs a frame frequency determination signal (F) to be used to determine the frame frequency. As binary logic, the frame frequency (60 Hz) of the normal driving corresponds to an H level, and the frame frequency (1 Hz) of the intermittent driving corresponds to an L level.

A process of generating the frame frequency determination signal (F) is described with reference to the waveform diagram of FIG. 5B.

First, in a time period (i), the video image is displayed, and the video/still image determination signal (P) is at the H level or P=H. The video/still image determination signal (P) is input to an OR (logical sum) element 51. When P=H, the frame frequency determination signal (F) at the H level is output regardless of the other input (Q illustrated in 5A) of the OR element 51, and the frame frequency is determined to be 60 Hz. The frame frequency determination signal (F) is input to a frame start signal generating circuit (FSGC) 52. The frame start signal generating circuit 52 generates a frame start signal (signal (G) instructing to start the scanning of the gate drivers) in the cycle of 1/60 seconds.

Next, in a time period (ii), the video image is changed to the still image and the video/still image determination signal (P) is at the L level or P=L. The video/still image determination signal (P) is directly input to one of inputs of the OR element, while a signal (Q) is input to the other input of the OR element through three delay elements 53. Each of the delay elements 53 has a function of transferring a value on an input side to an output side when the delay element receives the frame start signal once. After the video/still image determination signal (P) is changed from the H level to the L level, and the frame start signal is input three times, the signal (Q) is changed to an L level. Since the frame frequency determination signal (F) is a logical sum of the signals (P) and (Q), the frame frequency determination signal (F) is changed to the L level after the frame start signal is input three times. Specifically, after the video image is changed to the still image, the frame frequency determination signal (F) is at the H level for two frames, the frame frequency is determined to be 60 Hz, and the frame start signal generating circuit 52 generates the frame start signal in the cycle of 1/60 seconds. Then, the frame frequency determination signal (F) is changed to the L level for the third frame, the frame frequency is determined to be 1 Hz, and the frame start signal generating circuit 52 generates the frame start signal (G) in the cycle of 1 second.

Next, a time period (iii) is a time period for three and later frames of the still image. In the time period (iii), the signals (P) and (Q) are at the L levels, and thus the signal (F) is at the L level. The frame frequency is therefore determined to be 1 Hz, and the frame start signal generating circuit 52 continuously generates the frame start signal in the cycle of 1 second.

Next, in a time period (iv), the still image is changed to a video image. In the time period (iv), the signal (P) is at the H level, and thus the signal (F) is at the H level regardless of the state of the signal (Q). Thus, the frame frequency is determined to be 60 Hz, and the frame start signal generating circuit 52 generates the frame start signal (G) in the cycle of 1/60 seconds.

As illustrated in FIGS. 2A to 2C, the display device can be operated so as to ensure that time cycle within only two frames immediately after switching from a video image to a still image is not 1 second (intermittent driving) but 1/60 seconds (normal driving). By changing the number of delay elements 53, the number of frames (the number of transitional frames) with the frame frequency of 60 Hz immediately after switching from a video image to a still image can be easily changed. For example, a register that is configured to set the number of transitional frames may be arranged in the frame frequency determining circuit 50.

The liquid crystal display device according to the embodiment is generally used for a mobile device such as a smartphone, a tablet terminal, or a mobile PC, and for any liquid crystal device such as a PC monitor, a display for vehicle, a liquid crystal TV, or the like.

Although the number of transitional frames in the normal driving immediately after switching from a video image to a still image is 2 in the embodiment, the number of transitional frames may not be necessarily 2 and may be 1 or 3 or more. As the number of transitional frames is increased, a stepwise luminance response caused by the dielectric anisotropy can more quickly converge and an effect of suppressing a flicker becomes higher. However, if the number of transitional frames is too large, an effect of reducing circuit power by the intermittent driving is reduced. Thus, it is sufficient if an appropriate number of transitional frames is set in accordance with a relationship between a flicker and power consumption.

Although the normal driving is performed at the frame frequency of 1 Hz immediately after switching from a video image to a still image in the embodiment, the frame frequency may be set to a frequency that is higher than the frame frequency for the intermittent driving and lower than the frame frequency for the normal driving and does not cause a flicker to be visually recognized.

Although the invention devised by the present inventors is described according to the embodiment, the invention is not limited to the aforementioned embodiment and may be variously modified and changed.

Although the liquid crystal display device of the FFS mode is described in the embodiment, the invention is not limited to this and may be applicable to another liquid crystal display device of an In Plane Switching (IPS) mode or the like.

What is claimed is:

1. A display device comprising:

a first mode in which driving is performed at a first frame frequency corresponding to a first image signal; and a second mode in which the driving is performed at a second frame frequency lower than the first frame frequency corresponding to a second image signal, wherein after the first image signal is switched to the second image signal, a frame frequency is switched to the second mode after performing the first mode for at least one frame period.

2. The display device according to claim 1, wherein the first image signal is normal driving for a video image, and the second image signal is intermittent driving for a still image.

3. The display device according to claim 2, wherein the first frame frequency is 60 Hz, and the second frame frequency is 1 Hz.

4. The display device according to claim 1, wherein after an image signal is switched from the first image signal to the second image signal, a frame frequency is switched to the second mode after performing the first mode of two or three frames period.

5. A display device comprising a display panel and a control circuit, wherein:

the display panel includes a source driver and gate drivers;

the control circuit includes:

a first mode which controls the gate drivers and the source driver on the basis of a first frame frequency when a video image is to be displayed; and a second mode which controls the gate drivers and the source driver on the basis of a second frame frequency lower than the first frame frequency when a still image is to be displayed;

a switching period is inserted between the switching from the first mode to the second mode, a timing of the switching is performed based on a video/still image determination signal, and the still image of the video signal is outputted from the source driver in the first frame frequency during the switching period.

6. The display device according to claim 5, wherein:

the display panel includes a plurality of pixels arranged in a matrix form; and the plurality of pixels each include a pixel switch formed of a TFT, a pixel electrode connected to the pixel switch, a common electrode, and a liquid crystal layer.

7. The display device according to claim 5, wherein the first frame frequency is 60 Hz, and the second frame frequency is 1 Hz.

8. The display device according to claim 5, wherein:

the control circuit includes a frame frequency determining circuit;

the frame frequency determining circuit generates a frame frequency determination signal on the basis of the video/still image determination signal;

if the frame frequency determination signal is in a first state, the control circuit performs the driving at the first mode; and if the frame frequency determination signal is in a second state, the control circuit performs the driving at the second mode.

9. The display device according to claim 8, wherein:

the frame frequency determining circuit includes a delay circuit, a logical sum element, and a frame start signal generating circuit;

the frame start signal generating circuit generates a frame start signal on the basis of the frame frequency determination signal; and the delay element has a function of transferring a value on an input side to an output side upon an input of the frame start signal.

* * * * *